United States Patent
Kwak et al.

(10) Patent No.: US 11,096,171 B2
(45) Date of Patent: Aug. 17, 2021

(54) METHOD AND APPARATUS FOR PERFORMING BWP-BASED COMMUNICATION IN NR V2X

(71) Applicant: LG Electronics Inc., Seoul (KR)

(72) Inventors: Kyuhwan Kwak, Seoul (KR); Seungmin Lee, Seoul (KR); Hanbyul Seo, Seoul (KR); Daesung Hwang, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/811,328

(22) Filed: Mar. 6, 2020

(65) Prior Publication Data

US 2020/0229189 A1     Jul. 16, 2020

Related U.S. Application Data

(63) Continuation of application No. PCT/KR2020/000474, filed on Jan. 10, 2020.

(60) Provisional application No. 62/791,638, filed on Jan. 11, 2019, provisional application No. 62/794,719, filed on Jan. 21, 2019.

(51) Int. Cl.
*H04W 72/04* (2009.01)
*H04L 27/26* (2006.01)

(52) U.S. Cl.
CPC ..... *H04W 72/0453* (2013.01); *H04L 27/2605* (2013.01)

(58) Field of Classification Search
CPC .................................................. H04W 72/0453
See application file for complete search history.

(56) References Cited

U.S. PATENT DOCUMENTS

| | | | |
|---|---|---|---|
| 2018/0049047 A1* | 2/2018 | Lin | H04W 24/02 |
| 2018/0049169 A1* | 2/2018 | Lin | H04L 5/0094 |
| 2018/0131493 A1* | 5/2018 | Luo | H04L 5/0007 |
| 2018/0270699 A1* | 9/2018 | Babaei | H04W 72/1284 |
| 2019/0007923 A1* | 1/2019 | Blankenship | H04W 24/10 |
| 2019/0044569 A1* | 2/2019 | Fattinger | H04B 1/525 |
| 2019/0044598 A1* | 2/2019 | Talarico | H04L 27/0006 |
| 2019/0044669 A1* | 2/2019 | Davydov | H04L 5/005 |
| 2019/0044811 A1* | 2/2019 | Miao | H04L 41/0896 |

(Continued)

FOREIGN PATENT DOCUMENTS

WO    WO 2018/121621    7/2018

OTHER PUBLICATIONS

3rd Generation Partnership Project; Technical Specification Group Radio Access Network, "NR; Study on Vehicle-to-Everything (Release 16)," 3GPP TR 38.885 V1.0.0, Nov. 2018, 23 pages.

(Continued)

*Primary Examiner* — Jay Y Lee
*Assistant Examiner* — Andrew C Lee
(74) *Attorney, Agent, or Firm* — Fish & Richardson P.C.

(57) ABSTRACT

Provided herein are a method for performing wireless communication by a first apparatus and an apparatus for supporting the same. The method may include the steps of receiving a configuration related to a Uu bandwidth part (BWP) from a base station, and receiving a configuration related to a sidelink (SL) BWP from the base station. Herein, based on a numerology of the Uu BWP and a numerology of the SL BWP being different, the first apparatus may not perform SL communication on the SL BWP.

13 Claims, 20 Drawing Sheets

(56) References Cited

U.S. PATENT DOCUMENTS

| | | | |
|---|---|---|---|
| 2019/0045533 A1* | 2/2019 | Chatterjee | H04W 72/0446 |
| 2019/0075014 A1* | 3/2019 | Zhou | H04W 72/042 |
| 2019/0082431 A1* | 3/2019 | Yi | H04L 5/0057 |
| 2019/0097874 A1* | 3/2019 | Zhou | H04L 5/0023 |
| 2019/0104551 A1* | 4/2019 | Deenoo | H04W 76/28 |
| 2019/0141546 A1* | 5/2019 | Zhou | H04W 24/10 |
| 2019/0149365 A1* | 5/2019 | Chatterjee | H04L 5/0092 |
| | | | 370/329 |
| 2019/0207662 A1* | 7/2019 | Zhou | H04W 72/042 |
| 2019/0215756 A1* | 7/2019 | Park | H04W 52/06 |
| 2019/0239245 A1* | 8/2019 | Davydov | H04W 16/28 |
| 2019/0320467 A1* | 10/2019 | Freda | H04W 74/0833 |

OTHER PUBLICATIONS

Korean Notice of Allowance in Korean Appln. No. 10-2020-7002914, dated Jul. 8, 2020, 7 pages (with English translation).

Huawei, HiSilicon, "Bandwidth Parts and Resource Pools for NR V2X sidelink," R2-1816973, 3GPP TSG-RAN WG2 Meeting #104, Spokane, USA, Nov. 12-16, 2018, 4 pages.

Huawei, HiSilicon, "Sidelink PHY structure and procedure for NR V2X," R1-1810138, 3GPP TSG RAN WG1 Meeting #94bis, Chengdu, China, Oct. 8-12, 2018, 15 pages.

Seo, Hanbyul, "Status Report to TSG," RP-182490, 3GPP TSG RAN meeting #82, Sorrento, Italy, Dec. 10-13, 2018, 31 pages.

3rd Generation Partnership Project, Huawei, HiSilicon, "Bandwidth Parts and Resource Pools for V2X sidelink," R1-1813555, 3GPP TSG RAN WG1, Spokane, USA, dated Nov. 12-16, 2018, 13 pages.

3rd Generation Partnership Project, Huawei, HiSilicon, "Bandwidth Parts and Resource Pools for NR V2X sidelink," R2-1816973, 3GPP TSG-RAN WG2, Spokane, USA, dated Nov. 12-16, 2018, 6 pages.

3rd Generation Partnership Project, Huawei, HiSilicon, "Sidelink PHY structure and procedure for NR V2X," R1-1810138, 3GPP TSG RAN WG1, Chengdu, China, dated Oct. 8-12, 2018, 17 pages.

3rd Generation Partnership Project, LG Electronics, "Study on NR V2X," RP-182490, 3GPP TSG RAN, Sorrento, Italy, dated Dec. 10-13, 2018, 33 pages.

3rd Generation Partnership Project, Qualcomm Incorporated, "Considerations on Physical Layer aspects of NR V2X," R1-1813421, 3GPP TSG RAN WG1, Spokane, USA, dated Nov. 12-16, 2018, 18 pages.

International Search Report in International Appln. No. dated May 29, 2020, 6 pages (with English translation).

EP Extended European Search Report in European Appln. No. 20706051.8, dated Jun. 22, 2021, 8 pages.

Huawei, HiSilicon, "On relationship between SL BWP and Uu BWP," R1-1814304, 3GPP TSG RAN WG1 Meeting #95, Spokane, USA, dated Nov. 12-16, 2018, 3 pages.

\* cited by examiner

METHOD AND APPARATUS FOR PERFORMING BWP-BASED COMMUNICATION IN NR V2X

CROSS-REFERENCE TO RELATED APPLICATIONS

Pursuant to 35 U.S.C. § 119(e), this application is a continuation of International Application PCT/KR2020/000474, with an international filing date of Jan. 10, 2020, which claims the benefit of U.S. Provisional Applications No. 62/791,638 filed on Jan. 11, 2019, No. 62/794,719 filed on Jan. 21, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as BSM(Basic Safety Message), CAM(Cooperative Awareness Message), and DENM(Decentralized Environmental Notification Message) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, a bandwidth part (BWP) may be defined for various purposes in a communication system, for example, a purpose of supporting a user equipment (UE) operating by an RF bandwidth smaller than a carrier bandwidth, a power saving purpose of a UE that does not need to process a whole carrier/system bandwidth for transception, or a load balancing purpose within a component carrier, and so on. In such an environment, a UE performing sidelink (SL) communication may also be operated based on a BWP, and, according to a configuration of the BWP, the UE may perform switching between different BWPs. Accordingly, a method for minimizing influence caused by such latency (or delay) time to the SL communication and/or Uu communication needs to be considered. Additionally, an operation method for communication between UE having different BWP configurations also needs to be considered.

For example, in case a BWP is defined in a Uu link based communication and an SL based communication, depending upon the configurations of a center frequency, a bandwidth, a numerology, and/or related RRC parameters of each BWP, when performing switching between the BWPs of the UEs, a latency (or delay) time may be generated. Therefore, in a communication between UEs via SL operating based on a BWP, or in a communication between a UE and a base station via Uu link, a method for minimizing influence, caused by a latency (or delay) time, and so on, according to BWP switching, on an SL communication and/or a Uu communication, and an apparatus supporting the same need to be proposed.

Technical Solutions

According to an embodiment, provided herein is a method for performing wireless communication by a first apparatus. The method may include the steps of receiving a configuration related to a Uu bandwidth part (BWP) from a base station, and receiving a configuration related to a sidelink (SL) BWP from the base station. Herein, based on a numerology of the Uu BWP and a numerology of the SL BWP being different, the first apparatus may not perform SL communication on the SL BWP.

According to an embodiment, provided herein is a first apparatus for performing wireless communication. The first apparatus may include one or more memories storing instructions, one or more transceivers, and one or more processors connected to the one or more memories and the one or more transceivers. The one or more processors may execute the instructions to receive a configuration related to a Uu bandwidth part (BWP) from a base station, and to receive a configuration related to a sidelink (SL) BWP from the base station. Herein, based on a numerology of the Uu BWP and a numerology of the SL BWP being different, the first apparatus may not perform SL communication on the SL BWP.

Effects of the Disclosure

The user equipment (UE) may efficiently perform SL communication.

DESCRIPTION OF EXEMPLARY EMBODIMENTS

Figure 1:
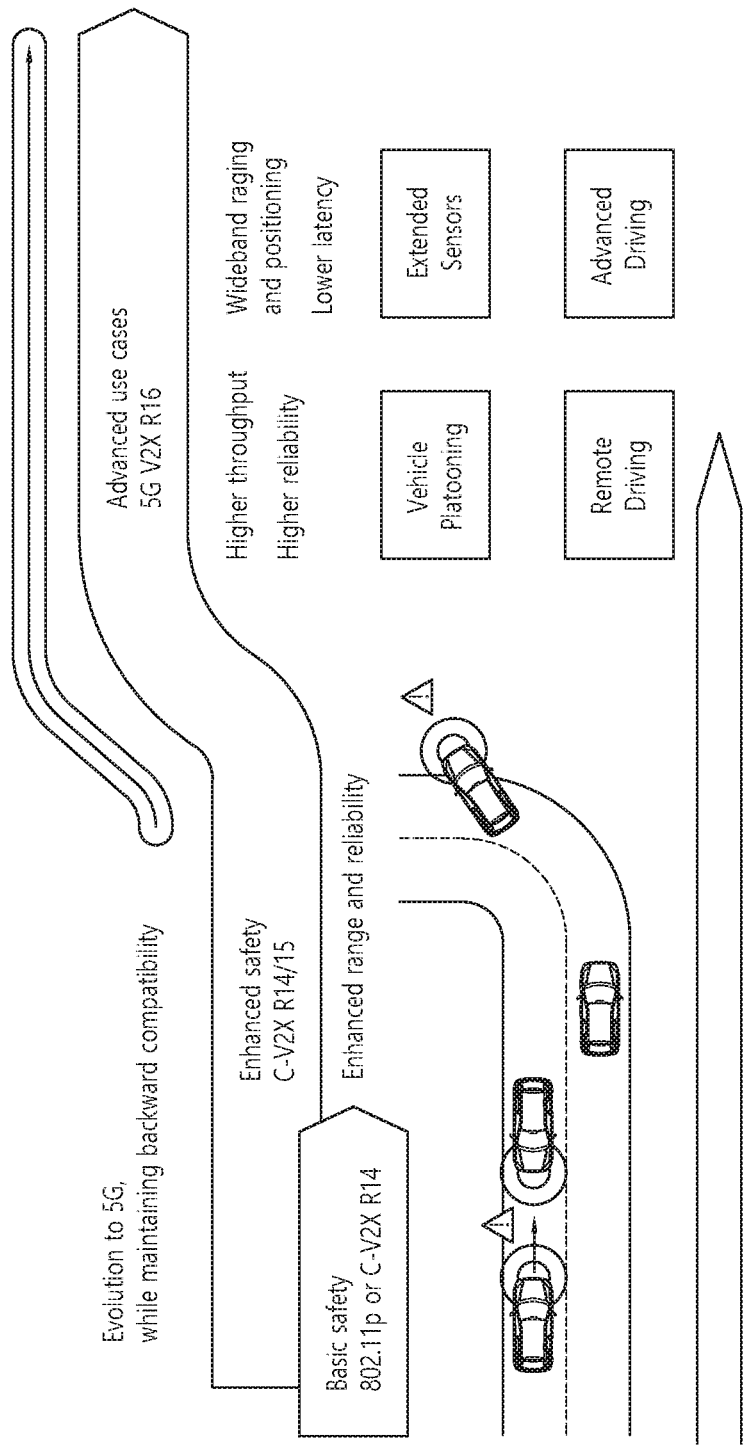
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
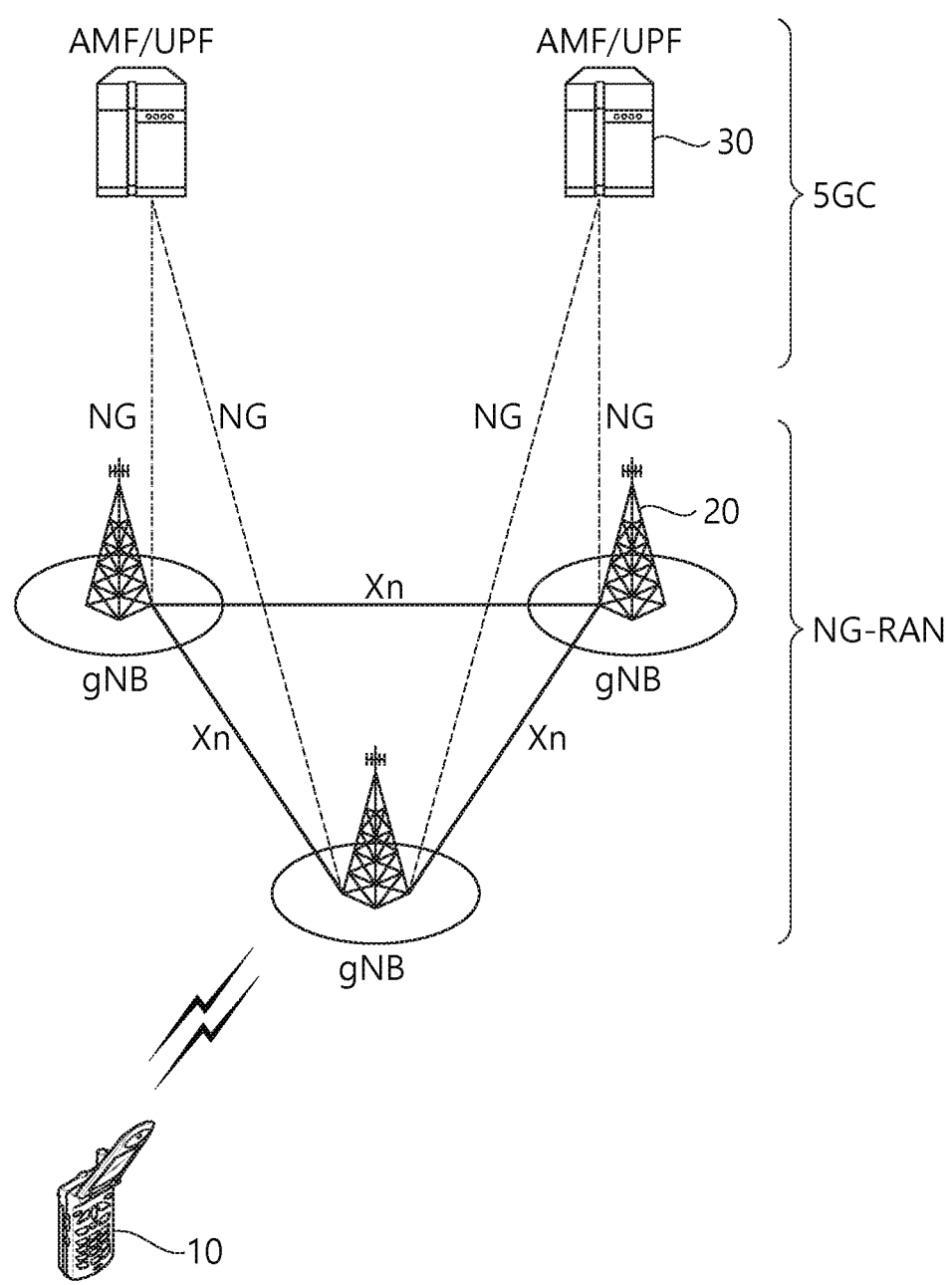
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
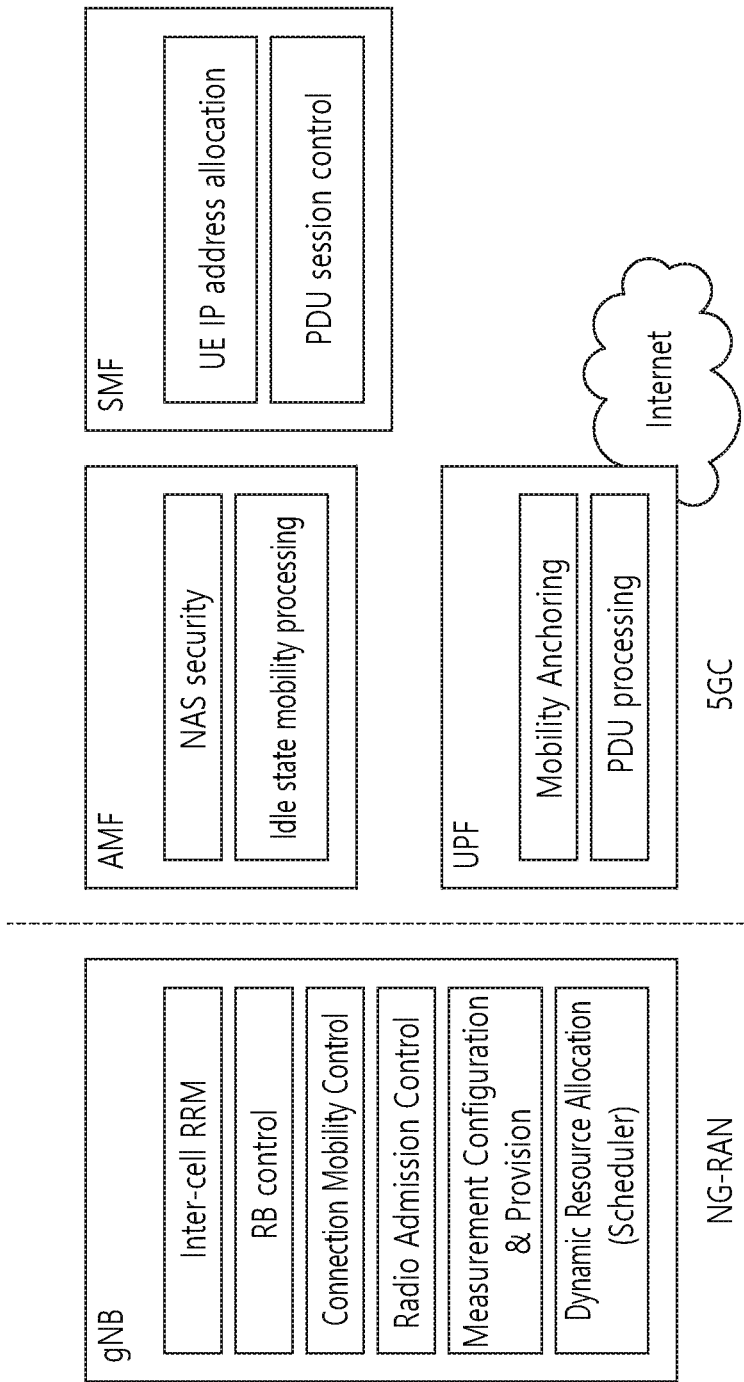
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
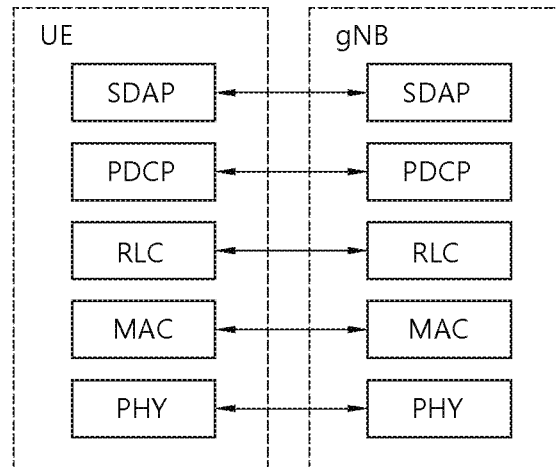
FIGS. 4A and 4B show a radio protocol architecture, in accordance with an embodiment of the present disclosure.
Figure 4B:
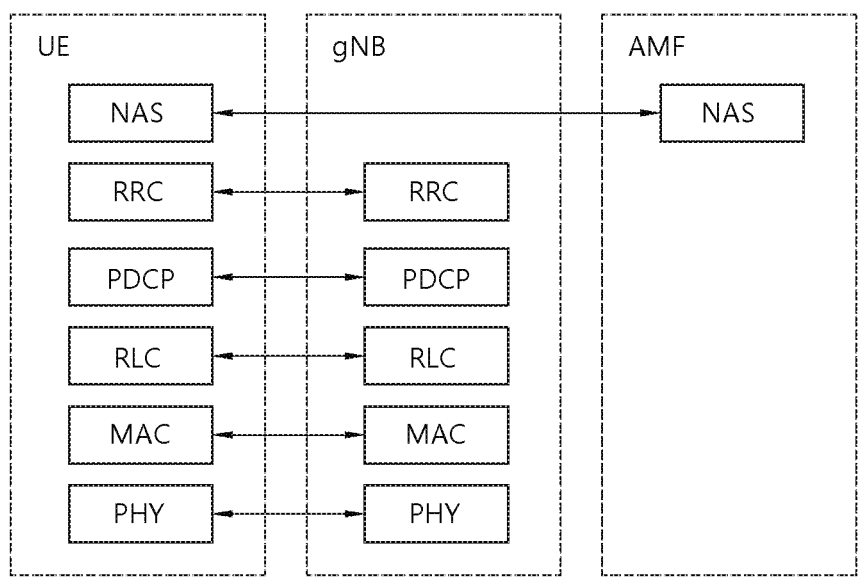

FIGS. 4A and 4B show a radio protocol architecture, in accordance with an embodiment of the present disclosure. The embodiment of FIGS. 4A and 4B may be combined with various embodiments of the present disclosure. Specifically, FIG. 4A shows a radio protocol architecture for a user plane, and FIG. 4B shows a radio protocol architecture for a control plane. The user plane corresponds to a protocol stack for user data transmission, and the control plane corresponds to a protocol stack for control signal transmission.

Referring to FIG. 4A and FIG. 4B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
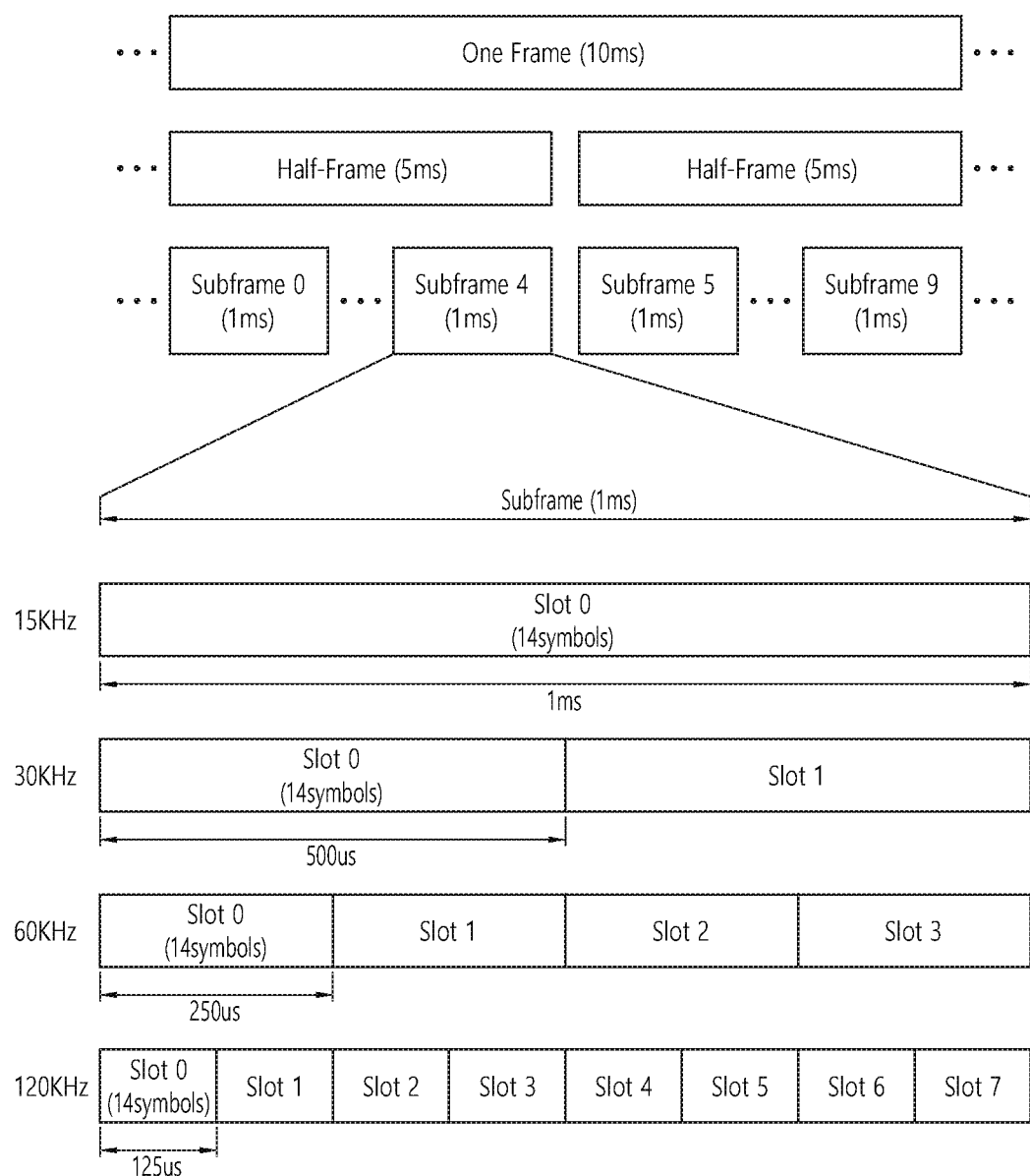
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15*2$^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15*2$^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
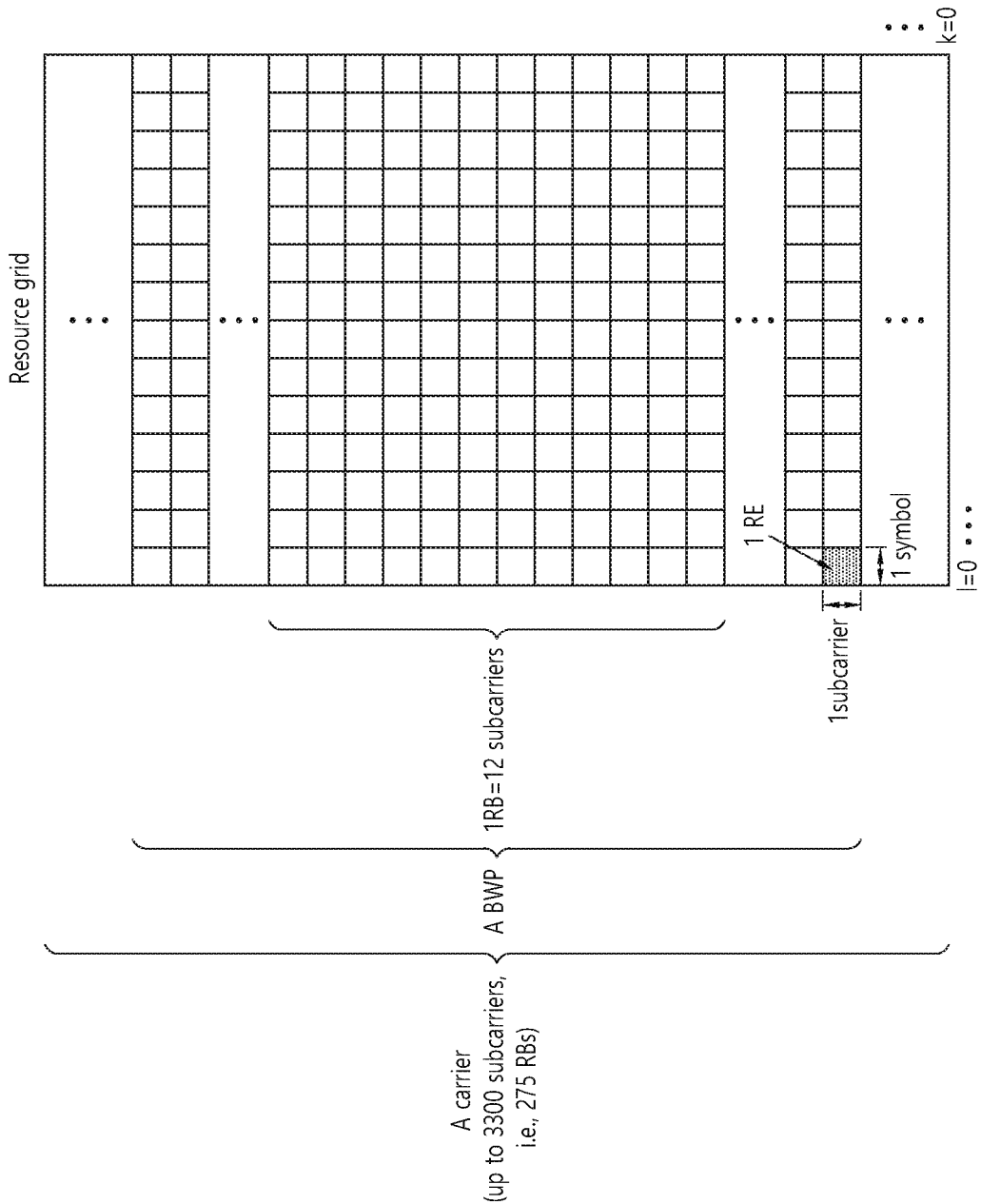
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
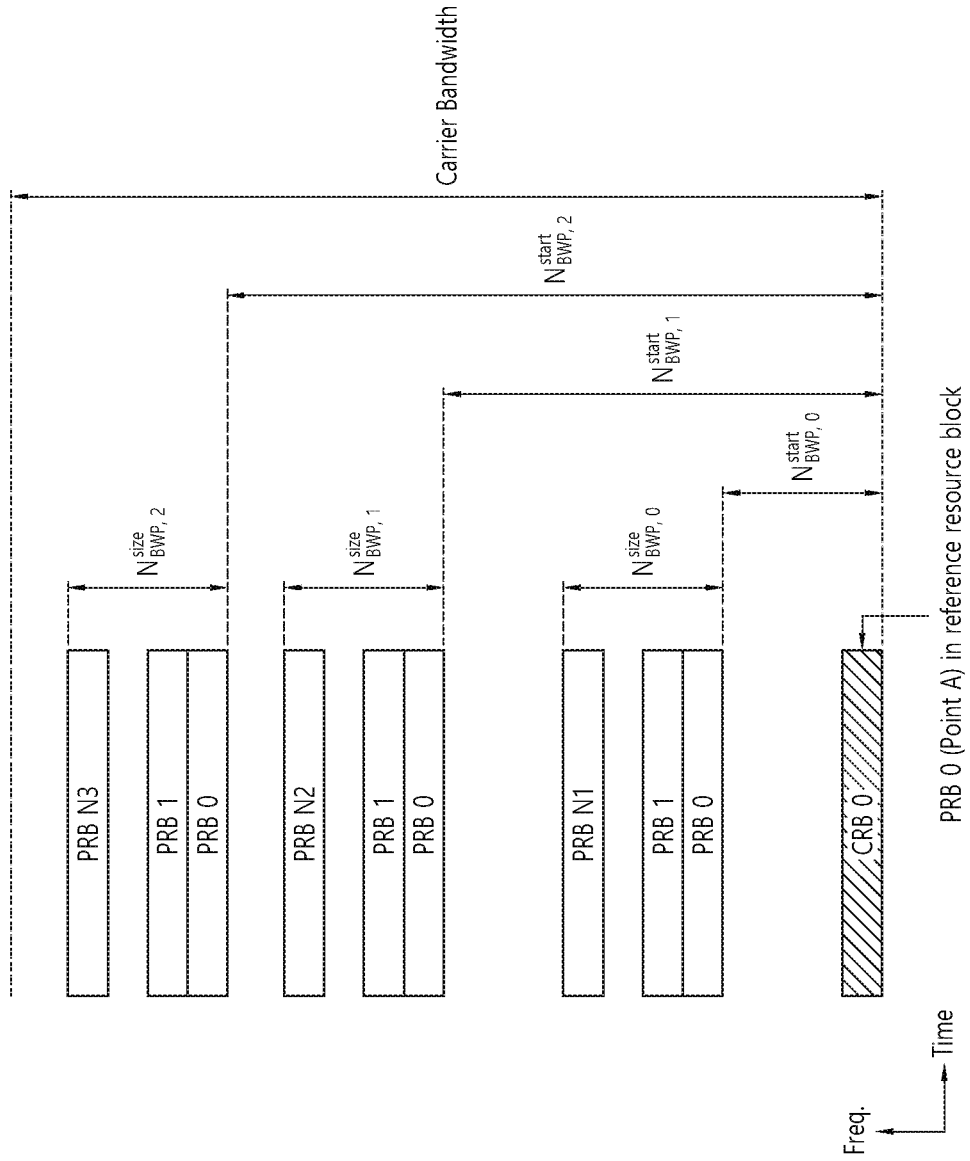
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
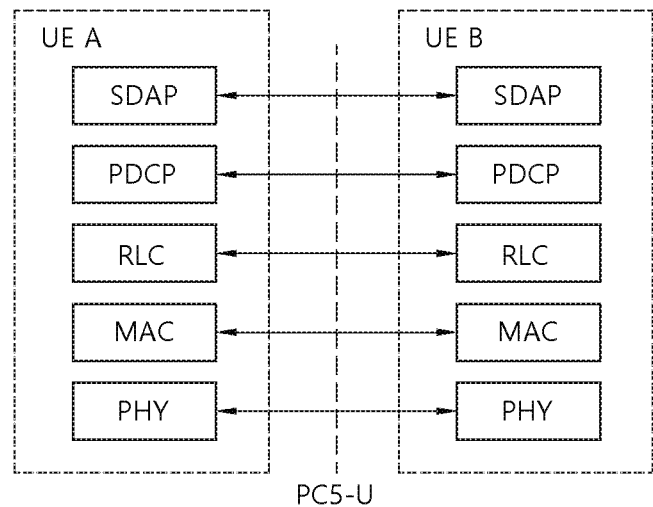
FIGS. 8A and 8B show a radio protocol architecture for a SL communication, in accordance with an embodiment of the present disclosure.
Figure 8B:
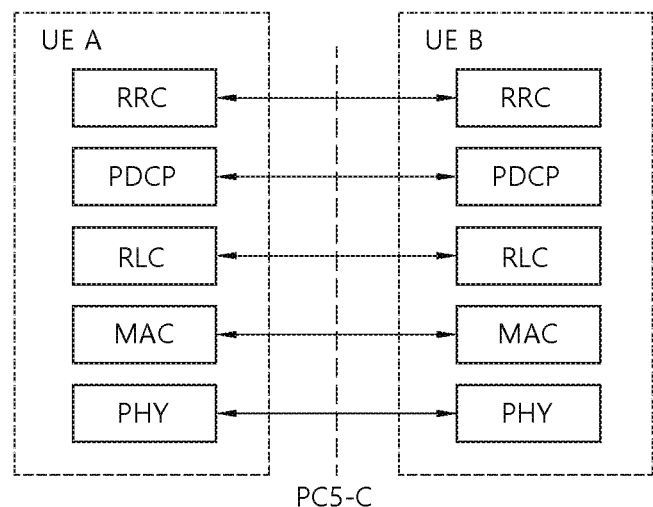

FIGS. 8A and 8B show a radio protocol architecture for a SL communication, in accordance with an embodiment of the present disclosure. The embodiment of FIGS. 8A and 8B may be combined with various embodiments of the present disclosure. More specifically, FIG. 8A shows a user plane protocol stack, and FIG. 8B shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
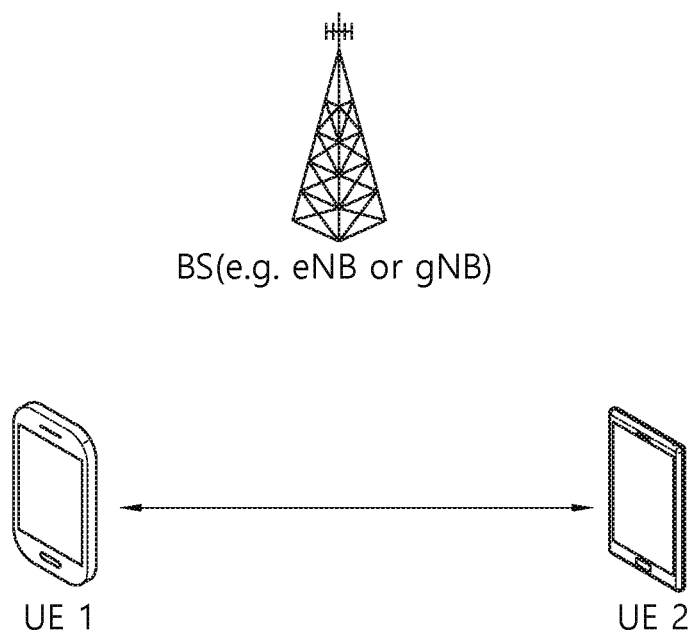
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10B:
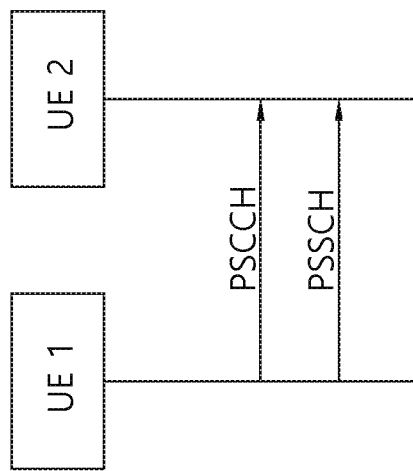
FIGS. 10A and 10B show a procedure of performing V2X or SL communication by a UE based on a transmission mode, in accordance with an embodiment of the present disclosure.
Figure 10A:
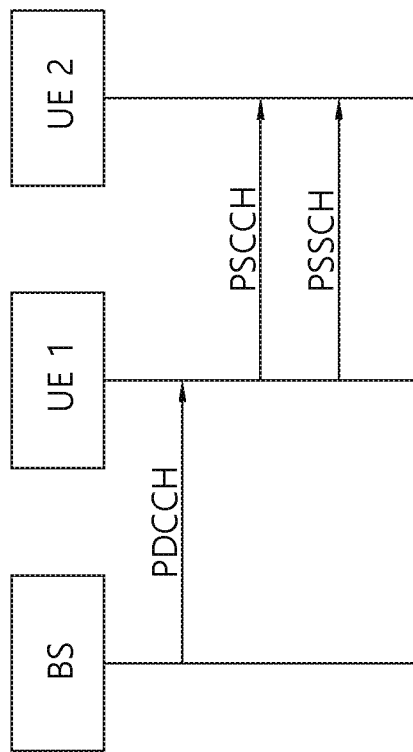

FIGS. 10A and 10B show a procedure of performing V2X or SL communication by a UE based on a transmission mode, in accordance with an embodiment of the present disclosure. The embodiment of FIGS. 10A and 10B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10A shows a UE operation related to an LTE transmission mode 1 or an LTE transmission mode 3. Alternatively, for example, FIG. 10A shows a UE operation related to an NR resource allocation mode 1. For example, the LTE transmission mode 1 may be applied to general SL communication, and the LTE transmission mode 3 may be applied to V2X communication.

For example, FIG. 10B shows a UE operation related to an LTE transmission mode 2 or an LTE transmission mode 4. Alternatively, for example, FIG. 10B shows a UE operation related to an NR resource allocation mode 2.

Referring to FIG. 10A, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11C:
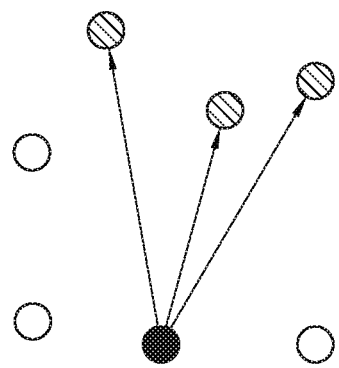
FIGS. 11A, 11B and 11C show three cast types, in accordance with an embodiment of the present disclosure.
Figure 11B:
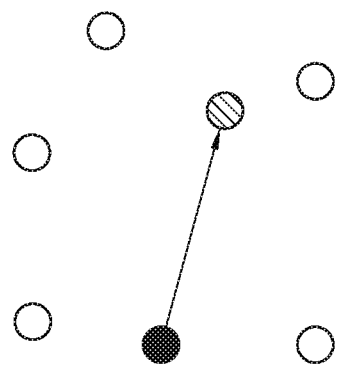
Figure 11A:
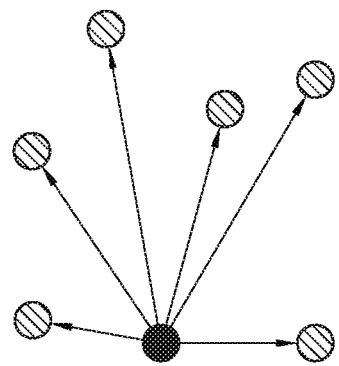

FIGS. 11A, 11B and 11C show three cast types, in accordance with an embodiment of the present disclosure. The embodiment of FIGS. 11A, 11B and 11C may be combined with various embodiments of the present disclosure. Specifically, FIG. 11A shows broadcast-type SL communication, FIG. 11B shows unicast type-SL communication, and FIG. 11C shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in a next generation system, various usage cases may be supported. For example, services for communication of self-driving vehicles, smart cars or connected cars, and so on, may be considered. For such services, each vehicle may receive and send (or transmit) information as a user equipment capable of performing communication. And, depending upon the circumstances, each vehicle may select resources for communication with the help (or assistance) of the base station or without any help (or assistance) of the base station and transmit and receive messages to and from other UEs.

Meanwhile, in a V2X system, in case a UE performs SL communication based on a BWP, the UE may perform switching between multiple BWPs. In this case, a latency (or delay) time may be generated due to the BWP switching. Therefore, a UE operation and a method for perform an efficient BWP-based communication need to be proposed so that minimal influence can be caused, by the latency (or delay) time, to the SL communication can/or Uu communication.

In this specification, although the proposed details and/or embodiments may be considered as a proposed method, a combination of each proposed detail and/or embodiment may also be considered as a new method. Additionally, it will be apparent that the proposed details shall not be limited only to the proposed embodiment of the present disclosure nor be limited only to a specific system. In case of all parameters, all operations, the combination(s) of each parameter and/or operation, the application or non-application of the corresponding parameter(s) and/or operation(s), and/or the application or non-application of the combination of each parameter and/or operation, the base station may signal (in advance) such combination(s) and/or application or non-application to the UE via higher layer signaling and/or physical layer signaling, or such combination(s) and/or application or non-application may be pre-defined in the system. For example, the higher layer signaling may be application layer signaling, L3 signaling, L2 signaling, and so on. For example, the physical layer signaling may be L1 signaling. Additionally, each detail of the present disclosure may be defined as each operation mode, and the base station may (pre-)configure one of the operation modes to the UE via higher layer signaling and/or physical layer signaling. The base station may enable the UE to operate in accordance with the corresponding mode. In this specification, TTI may correspond to a unit of various lengths, such as a sub-slot/slot/subframe or a basic unit, which is a basic transport unit, and so on. In this specification, the UE may correspond to an apparatus of various forms, such as a vehicle, a pedestrian terminal (or UE), and so on. Additionally, in this specification, details related to the operations of the UE, the base station and/or a road side unit (RSU) may not be limited only to each apparatus (or device) type and may also be applied to different types of apparatuses (or devices). For example, in this specification, the details that are described as the operations of the base station may also be applied as the operations of the UE.

For example, in case the UE performs Uu communication and SL communication based on a BWP, at least one of a center frequency, a bandwidth, a numerology, and/or an RRC parameter of the BWPs being configured for the UE may be different. In this case, if the UE performs switching between the BWPs, additional latency (or delay) time may be generated. For simplicity in the description, a BWP through which the UE performs SL communication may be referred to as SL BWP, and a BWP through which the UE performs uplink communication or downlink communication with the base station may be referred to as a Uu BWP. For example, in case of a UE operating based on instructions of the base station, in order to receive the instructions of the base station, the UE may attempt to receive downlink control information from the Uu BWP, and the UE may perform SL transmission in the SL BWP in accordance with the instructions. During this process, the UE may be required to perform switching between the Uu BWP and the SL BWP. In this case, in case at least one of a center frequency, a bandwidth, a numerology, and/or an RRC parameter is differently configured between the Uu BWP and the SL BWP, when the UE performs switching between the Uu BWP and the SL BWP, a latency (or delay) time may be generated. Furthermore, in the above-described example, if requirements of a service that is to be transmitted by the UE requires a very short latency (or delay) time (e.g., 3 ms), due to the latency time required for the BWP switching, the service requirement may not be satisfied. Therefore, a method for resolving the problems caused by the latency time due to the BWP switching and an apparatus (or device) for supporting the same need to be proposed.

According to an embodiment of the present disclosure, in order to reduce latency time caused by BWP switching of the UE, the UE may configure an RF bandwidth so that the RF bandwidth can include part or all of the BWP from the one or more Uu BWPs and the SL BWP, which are configured in the UE. For example, based on the configurations related to the one or more Uu BWPs and the configuration of the SL BWP received from the base station, in case the UE configures the one or more Uu BWPs and the SL BWP, the UE may configure an RF bandwidth so that the RF bandwidth can include part or all of the BWP from the one or more Uu BWPs and the SL BWP, which are configured in the UE. In this case, the base station may configure a BWP to the UE so that the numerology and/or RRC parameter, and so on, of the one or more Uu BWPs and the SL BWP being configured to the UE can be aligned.

However, if the UE configures its RF bandwidth so that the RF bandwidth can include all of the one or more Uu BWPs and the SL BWP, which are configured in the UE, unnecessary power waste, and so on, may occur. Therefore, the UE may configure its RF bandwidth so that the RF bandwidth can include part of the BWP from the one or more Uu BWPs and the SL BWP, which are configured in the UE. As a possible method, in case the base station configures the BWP to the UE, for example, in case the base station transmits configuration related to the BWP to the UE, additionally, the base station may additionally transmit separate indication or information to the UE. In this case, for example, the indication or information may be indication or information enabling the UE to configure its RF bandwidth by including the corresponding BWP. For example, the base station, which transmits the configuration related to the BWP to the UE, may transmit separate indication or information to the UE so as to enable the UE to configure its RF bandwidth by including the corresponding BWP. For example, the indication or information may be indication or information on a BWP being used for the SL transmission, by the UE, which performs SL transmission based on an indication from the base station.

According to an embodiment of the present disclosure, through the separate indication, the base station may directly configure to the UE whether or not the corresponding Uu BWP can be activated simultaneously with the SL BWP. For example, it will be assumed that the base station configures Uu BWP #1, Uu BWP #2 and SL BWP to the UE. In this case, the base station may notify to the UE whether or not Uu BWP #1 can be activated simultaneously with the SL BWP. Additionally, the base station may notify to the UE whether or not Uu BWP #2 can be activated simultaneously with the SL BWP. More specifically, for example, through the indication or information, the base station may indicate or configure an active Uu BWP to the UE.

Apart from the above-described explicit method, the base station may implicitly notify, to the UE, whether or not the corresponding Uu BWP can be activated simultaneously with the SL BWP per Uu BWP.

Figure 12:
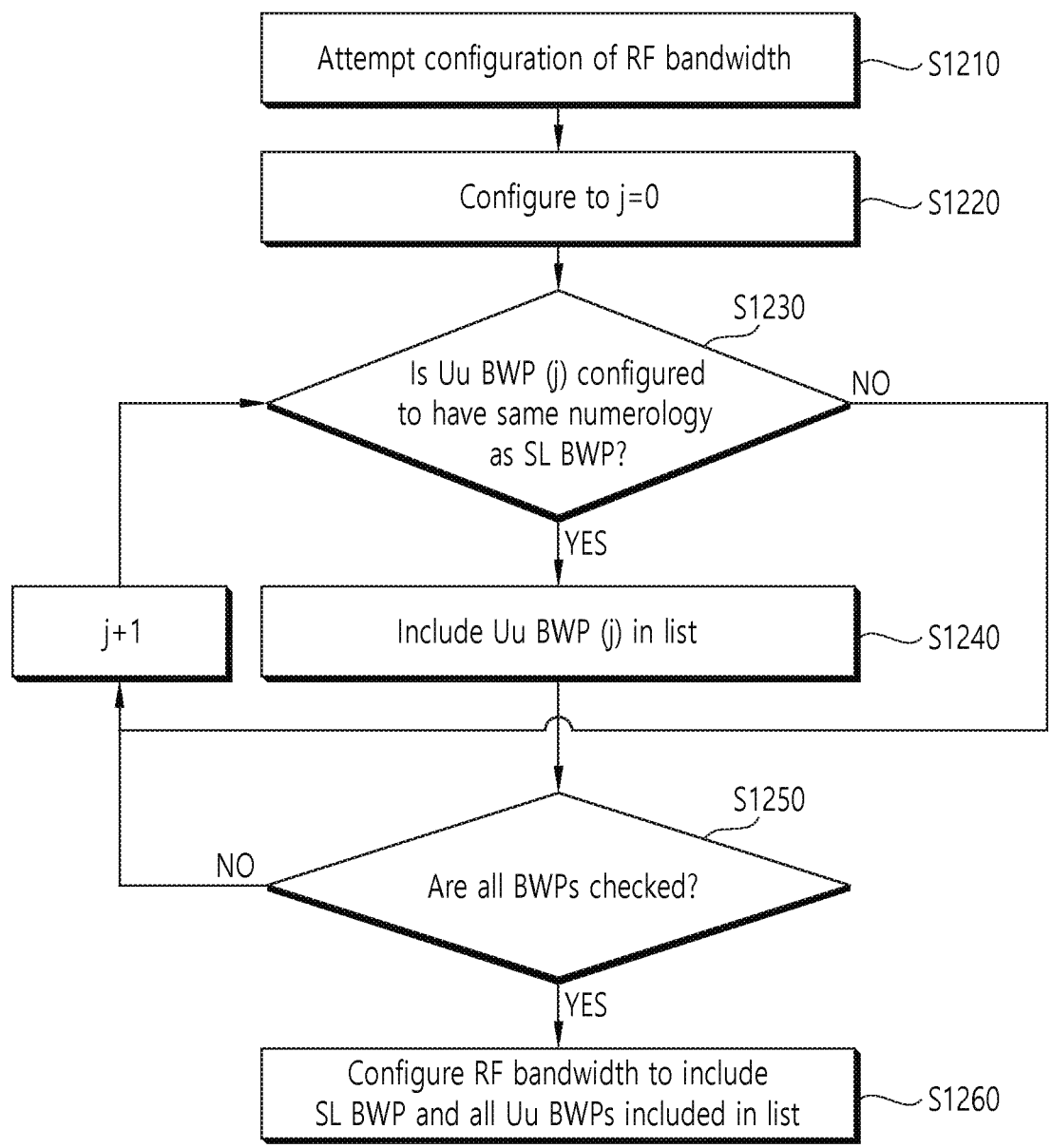
FIG. 12 shows a procedure for configuring an RF bandwidth, by a UE, according to an embodiment of the present disclosure.

FIG. 12 shows a procedure for configuring an RF bandwidth, by a UE, according to an embodiment of the present disclosure. The embodiment of FIG. 12 may be combined with other various embodiments of the present disclosure.

Referring to FIG. 12, the UE may configure its RF bandwidth so that the RF bandwidth can include only one or more Uu BWPs, which satisfy(/satisfies) a predetermined condition based on the one or more SL BWPs configured in the UE. For example, the UE may configure the RF bandwidth of the UE by including only the Uu BWP being configured of the same numerology based on the SL BWP.

More specifically, in step S1210, the UE may initiate a procedure for configuring its RF bandwidth. In step S1210, the UE may configure j=0. For example, in the embodiment of FIG. 12, it will be assumed that the UE receives configurations related to Uu BWP #0 to Uu BWP #3 from the base station. Additionally, it will be assumed that the numerology of SL BWP, the numerology of Uu BWP #1, and the numerology of Uu BWP #2 are the same.

In step S1230, the UE may determine whether or not Uu BWP (j) is configured of the same numerology as SL BWP. Currently, since j=0, the UE may determine whether or not the numerology of Uu BWP #0 and the numerology of SL BWP are the same. In the embodiment of FIG. 12, since the numerology of Uu BWP #0 is different from the numerology of SL BWP, the UE may increment the j value by 1. Returning back to step S1230, the UE may determine whether or not Uu BWP (j) is configured of the same numerology as SL BWP. Currently, since j=1, the UE may determine whether or not the numerology of Uu BWP #1 and the numerology of SL BWP are the same. In the embodiment of FIG. 12, since the numerology of Uu BWP #1 is the same as the numerology of SL BWP, in step S1240, the UE may include Uu BWP #1 in its list.

In step S1250, the UE may determine whether or not all BWP are checked. Since the UE has not yet checked Uu BWP #2 to Uu BWP #4, the UE may increment the j value by 1 and may perform step S1230.

If the above-described process is repeated, in step S1260, the UE may configure its RF bandwidth so that the RF bandwidth can include SL BWP and all Uu BWPs included in its list. For example, in the embodiment of FIG. 12, the UE may configure its RF bandwidth so that the RF bandwidth can include SL BWP, Uu BWP #1, and Uu BWP #2.

According to an embodiment of the present disclosure, the base station may configure one or more Uu BWP and SL BWP to the UE. For example, the numerology of the Uu BWP and the numerology of the SL BWP may be different. For example, based on the numerology of the Uu BWP being different from the numerology of the SL BWP, a first device (or apparatus) may not perform SL communication on the SL BWP. And, based on the numerology of the Uu BWP being different from the numerology of the SL BWP, the SL BWP may be deactivated. For example, the Uu BWP may be an active UL BWP. For example, the Uu BWP may be an active DL BWP.

For example, based on an interruption time being required between the Uu BWP based communication and the SL BWP based communication, the UE may determine whether or not to perform SL communication on the SL BWP. Alternatively, for example, based on a switching latency being required between the Uu BWP based communication and the SL BWP based communication, the UE may determine whether or not to perform SL communication on the SL BWP.

For example, in case the interruption time being required between the Uu BWP based communication and the SL BWP based communication is equal to or longer than or exceeds a threshold value, the UE may not perform the SL communication on the SL BWP. For example, the UE may suspend the SL communication on the SL BWP. For example, the UE may deactivate the SL BWP. Conversely, for example, in case the interruption time being required between the Uu BWP based communication and the SL BWP based communication is equal to or shorter than or less than a threshold value, the UE may perform the SL communication on the SL BWP. For example, the threshold value may be configured in advance for the UE. For example, in case the numerology of the Uu BWP and the numerology of the SL BWP are different, an interruption time may be generated between the Uu BWP based communication and the SL BWP based communication. For example, in case the center frequency of the Uu BWP and the center frequency of the SL BWP are different, an interruption time may be generated between the Uu BWP based communication and the SL BWP based communication. For example, in case the bandwidth of the Uu BWP and the bandwidth of the SL BWP are different, an interruption time may be generated between the Uu BWP based communication and the SL BWP based communication.

For example, in case the switching latency being required between the Uu BWP based communication and the SL BWP based communication is equal to or longer than or exceeds a threshold value, the UE may not perform the SL communication on the SL BWP. For example, the UE may suspend the SL communication on the SL BWP. For example, the UE may deactivate the SL BWP. Conversely, for example, in case the switching latency being required between the Uu BWP based communication and the SL BWP based communication is equal to or shorter than or less than a threshold value, the UE may perform the SL communication on the SL BWP. For example, the threshold value may be configured in advance for the UE. For example, in case the numerology of the Uu BWP and the numerology of the SL BWP are different, a switching latency may be generated between the Uu BWP based communication and the SL BWP based communication. For example, in case the center frequency of the Uu BWP and the center frequency of the SL BWP are different, a switching latency may be generated between the Uu BWP based communication and the SL BWP based communication. For example, in case the bandwidth of the Uu BWP and the bandwidth of the SL BWP are different, a switching latency may be generated between the Uu BWP based communication and the SL BWP based communication.

For example, among the one or more Uu BWPs configured to the UE, the UE may determine only one or more Uu BWPs in which switching latency to the SL BWP is not required. And, the UE may perform SL communication based on the Uu BWP in which switching latency to the SL BWP is not required. In other words, in case the base station configures a specific Uu BWP to the UE, and, in case additional switching latency is required when the UE performs switching between the SL BWP and the specific Uu BWP, the UE may implicitly assume or determine not to perform SL communication based on the specific Uu BWP. For example, in case the numerology of the Uu BWP and the numerology of the SL BWP are differently configured, when the UE performs switching between the Uu BWP and the SL BWP, additional switching latency may be required. For example, in case the center frequency of the Uu BWP and the center frequency of the SL BWP are differently configured, when the UE performs switching between the Uu BWP and the SL BWP, additional switching latency may be required. For example, in case the bandwidth of the Uu BWP and the bandwidth of the SL BWP are differently configured, when the UE performs switching between the Uu BWP and the SL BWP, additional switching latency may be required.

According to an embodiment of the present disclosure, a BWP may be configured for the UE so that an inclusion relation can be established between one or more BWPs having the need to reduce the switching latency time. However, in this case, exceptions and/or exclusions may be defined. For example, a BWP being configured for broadcasting in a link (e.g., Uu link) between the UE and the base station may be excluded from the aforementioned inclusion relation. For example, a BWP being used during an initial access process of the UE may be excluded from the aforementioned inclusion relation. In other words, in case of the BWP being used during the initial access process of the UE, the BWP may be configured, for the UE, to not include the SL BWP. Additionally, in case the SL BWP and the Uu BWP are configured, for the UE, so as to be in an inclusion relation, between the corresponding BWPs, the UE may configure its RF bandwidth based on a BWP having a larger bandwidth. For example, in case the Uu BWP is configured to include the SL BWP, the UE may configure its RF bandwidth to include the Uu BWP. For example, in case the SL BWP is configured to include the Uu BWP, the UE may configure its RF bandwidth to include the SL BWP. In other words, in case the UE performs switching between BWPs being in an inclusion relation, the UE may match its RF bandwidth to the BWP having the larger bandwidth between the two BWPs. In this case, even if the UE performs switching to the BWP having the smaller bandwidth, between the two BWPs, the UE may maintain the configuration for the corresponding RF bandwidth.

According to an embodiment of the present disclosure, the UE may perform SL communication while considering the latency caused by BWP switching. For example, in case the UE performing the SL communication reserves a resource pool in which the UE intends to perform communication, by considering the latency time consumed for the BWP switching and/or a section (or duration) during which the UE is to be relocated to another BWP via BWP switching or a section (or duration) during which the UE is predicted to be relocated to another BWP via BWP switching, the UE may exclude the corresponding duration (or section) from its resource reservation process. For example, in case the UE performs switching between BWPs in an environment having switching latency applied thereto, if the base station configures a Uu BWP requiring switching latency for the UE, the UE performing switching from the SL BWP to the Uu BWP may assume or determine that part of the resources within the SL BWP is used for the purpose of switching. For example, in case the UE performs switching between BWPs in an environment having switching latency applied thereto, if the base station configures a Uu BWP requiring switching latency for the UE, the UE performing switching from the SL BWP to the Uu BWP may defined so that part of the resources within the SL BWP cannot be used. For example, in case the UE performs switching between BWPs in an environment having switching latency applied thereto, if the base station configures a Uu BWP requiring switching latency for the UE, the UE performing switching from the Uu BWP to the SL BWP may assume or determine that part of the resources within the SL BWP is used for the purpose of switching. For example, in case the UE performs switching between BWPs in an environment having switching latency applied thereto, if the base station configures a Uu BWP requiring switching latency for the UE, the UE performing switching from the Uu BWP to the SL BWP may defined so that part of the resources within the SL BWP cannot be used.

According to an embodiment of the present disclosure, through the configuration for a resource pool within the BWP being configured for the SL, the UE may use the resources with more flexibility. For example, the UE may be configured (in advance) with multiple resource pools, and the UE may perform SL communication by using all or part of the corresponding multiple resource pools. In this case, the UE may notify the information on its selected resource pool to another UE or to the base station. Alternatively, for example, the UE may notify the information on the resource pool, which is configured from the base station, to another UE or to the base station. For example, the resource pool information may include information on a resource reception pool of the UE. For example, the UE may notify information on a resource area used by the UE itself for monitoring or transmission to another UE or to the base station. In the above-described operation, in case the UE selects a resource pool, the UE may select a resource pool while considering a BWP for a target UE or an in-coverage/out-of-coverage UE and/or a resource pool configuration.

According to an embodiment of the present disclosure, the UE may receive, from the base station, configuration on a resource performing communication without any grant from the base station through a Uu link. For example, a configured grant (CG) defined in an NR may be considered. In case of a Configured Grant (CG) Type 2 operation, the base station may allocate a resource to the UE via higher layer signaling and physical layer signaling, and the base station may activate or release the CG. Herein, in case the base station configures multiple CGs to the UE, the base station may activate or release the multiple CGs through one DCI. In this case, in order to differently configure the resource configuration of each CG, a resource allocation related field within the DCI needs to be defined for each of the configured multiple CGs. In this case, in order to reduce overhead of the DCI, a total sum of the sizes of the resource configuration fields for the multiple CGs may be fixed, and the size of a field corresponding to the resource configuration of each CG within the corresponding fixed total sum of the sizes may be determined in correspondence with the number of configured CGs. In other words, according to the configured number of CGs, resource configuration granularity for each CG may be differently applied.

According to an embodiment of the present disclosure, the latency time consumed for the BWP switching of the UE may be reduced. Additionally, the influence caused by the BWP switching on the Uu link-based communication or the SL-based communication may be reduced. Additionally, the UE may use resources for communication more efficiently.

Figure 13:
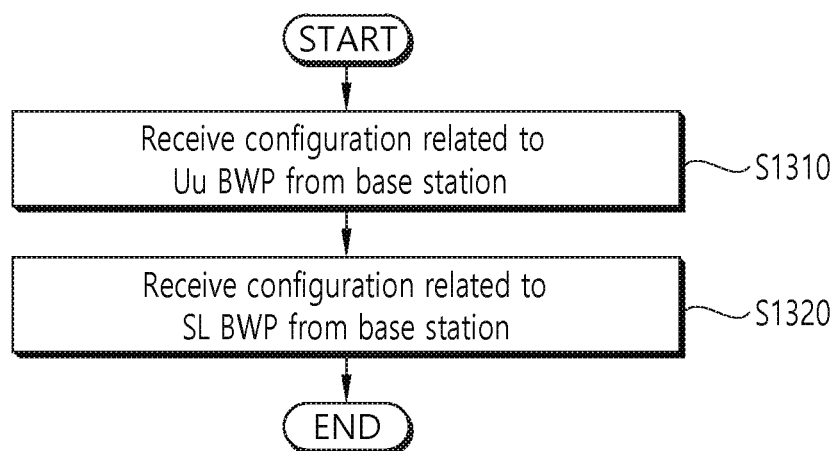
FIG. 13 shows a method for performing wireless communication, by a first device (or apparatus), according to an embodiment of the present disclosure.

FIG. 13 shows a method for performing wireless communication, by a first device (or apparatus), according to an embodiment of the present disclosure. The embodiment of FIG. 13 may be combined with other various embodiments of the present disclosure.

Referring to FIG. 13, in step S1310, the first device (or apparatus) may receive a configuration related to a Uu bandwidth part (BWP) from a base station. For example, the Uu BWP may be an active BWP. For example, the active BWP may be an active uplink BWP. For example, the active BWP may be an active downlink BWP. For example, a configuration related to the Uu BWP may include at least one of a numerology related to the Uu BWP, a center frequency related to the Uu BWP, or a bandwidth related to the Uu BWP. For example, the Uu BWP may be at least one of a BWP related to an uplink communication and a BWP related to a downlink communication being configured for the first device (or apparatus).

In step S1320, the first device (or apparatus) may receive a configuration related to a sidelink (SL) BWP from the base station. For example, a configuration related to the SL BWP may include at least one of a numerology related to the SL BWP, a center frequency related to the SL BWP, or a bandwidth related to the SL BWP. For example, the SL BWP may be a BWP related to SL communication being configured for the first device (or apparatus).

For example, a numerology of the Uu BWP and a numerology of the SL BWP may be different. For example, based on the numerology of the Uu BWP and the numerology of the SL BWP being different, the first device (or apparatus) may not perform SL communication on the SL BWP. For example, the numerology may include at least one of subcarrier spacing and cyclic prefix (CP). For example, the subcarrier spacing may be one of 15 kHz, 30 kHz, 60 kHz, 120 kHz, and 240 kHz. For example, the cyclic prefix (CP) may be one of a normal cyclic prefix (CP) and an extended cyclic prefix (CP). For example, based on the numerology of the Uu BWP and the numerology of the SL BWP being different, the SL BWP may be deactivated.

For example, based on the numerology of the Uu BWP and the numerology of the SL BWP being different, the first device (or apparatus) may not perform Uu BWP-based SL communication on the SL BWP. For example, the Uu BWP-based SL communication may be SL communication performed by the first device (or apparatus) on the SL BWP based on Downlink Control Information (DCI) received, by the first device (or apparatus), from the base station on the Uu BWP.

For example, based on an interruption time being required between the Uu BWP-based communication and the SL BWP-based communication, the first device (or apparatus) may not perform SL communication on the SL BWP.

According to an embodiment of the present disclosure, a first device (or apparatus) for performing wireless communication may be provided. For example, the first device (or apparatus) may include one or more memories storing instructions, one or more transceivers, and one or more processors connected to the one or more memories and the one or more transceivers. For example, the one or more processors may execute the instructions to receive a configuration related to a Uu bandwidth part (BWP) from a base station, and to receive a configuration related to a sidelink (SL) BWP from the base station. Herein, based on the numerology of the Uu BWP and the numerology of the SL BWP being different, the first device (or apparatus) may not perform SL communication on the SL BWP.

According to an embodiment of the present disclosure, a device (or apparatus) configured to control a first user equipment (UE) may be provided. For example, the device (or apparatus) may include one or more processors, and one or more memories being operably connectable to the one or more processors and storing instructions. For example, the one or more processors may execute the instructions to receive a configuration related to a Uu bandwidth part (BWP) from a base station, and to receive a configuration related to a sidelink (SL) BWP from the base station. Herein, based on a numerology of the Uu BWP and a numerology of the SL BWP being different, the first UE may not perform SL communication on the SL BWP.

According to an embodiment of the present disclosure, a non-transitory computer-readable medium having instructions recorded thereon may be provided. For example, when enacted by one or more processors, the instructions may cause the one or more processors to receive, by a first device (or apparatus), a configuration related to a Uu bandwidth part (BWP) from a base station, and receive, by the first device (or apparatus), a configuration related to a sidelink (SL) BWP from the base station. Herein, based on the numerology of the Uu BWP and the numerology of the SL BWP being different, the first device (or apparatus) may not perform SL communication on the SL BWP.

Figure 14:
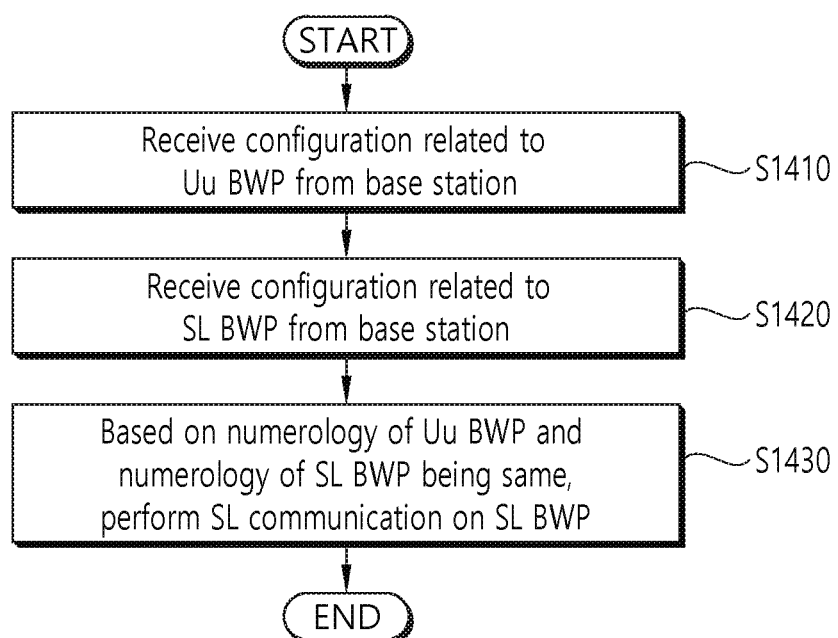
FIG. 14 shows a method for performing wireless communication, by a first device (or apparatus), according to an embodiment of the present disclosure.

FIG. 14 shows a method for performing wireless communication, by a first device (or apparatus), according to an embodiment of the present disclosure. The embodiment of FIG. 14 may be combined with other various embodiments of the present disclosure.

Referring to FIG. 14, in step S1410, the first device (or apparatus) may receive a configuration related to a Uu bandwidth part (BWP) from a base station. For example, the Uu BWP may be an active BWP. For example, the active BWP may be an active uplink BWP. For example, the active BWP may be an active downlink BWP. For example, a configuration related to the Uu BWP may include at least one of a numerology related to the Uu BWP, a center frequency related to the Uu BWP, or a bandwidth related to the Uu BWP. For example, the Uu BWP may be at least one of a BWP related to an uplink communication and a BWP related to a downlink communication being configured for the first device (or apparatus).

In step S140, the first device (or apparatus) may receive a configuration related to a sidelink (SL) BWP from the base station. For example, a configuration related to the SL BWP may include at least one of a numerology related to the SL BWP, a center frequency related to the SL BWP, or a bandwidth related to the SL BWP. For example, the SL BWP may be a BWP related to SL communication being configured for the first device (or apparatus). For example, a numerology of the Uu BWP and a numerology of the SL BWP may be the same.

In step S1430, based on the numerology of the Uu BWP and the numerology of the SL BWP being the same, the first device (or apparatus) may perform SL communication on the SL BWP. As described above, if the numerology of the Uu BWP and the numerology of the SL BWP are different, the first device (or apparatus) may not perform SL communication on the SL BWP.

The various embodiments of the present disclosure may be applied not only in vehicle-to-vehicle communication, but also to vehicle-to-pedestrian communication, vehicle-to-base station communication or vehicle-to-fixed node communication. For example, in the communication with a base station, a location and speed (or rate) of an opposite party receiver may be considered as being fixed.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
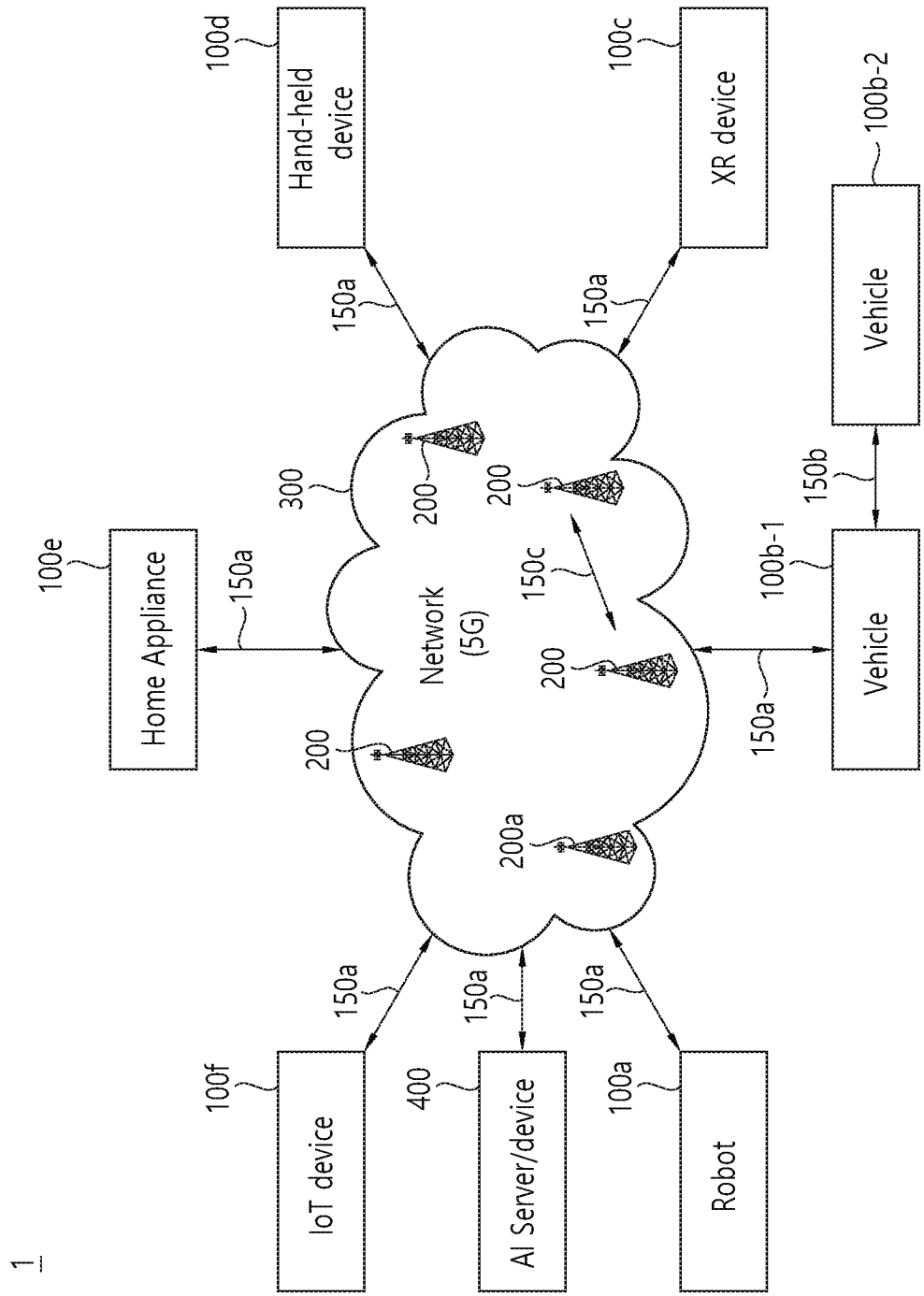
FIG. 15 shows a communication system 1, in accordance with an embodiment of the present disclosure.

FIG. 15 shows a communication system 1, in accordance with an embodiment of the present disclosure.

Referring to FIG. 15, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication(e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
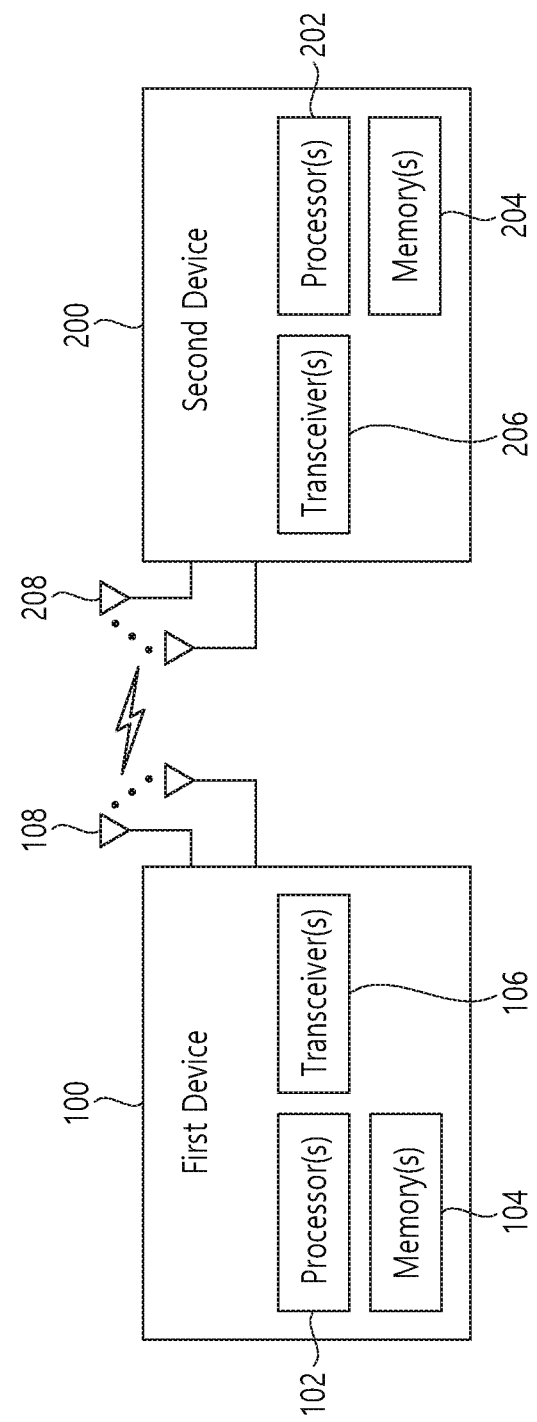
FIG. 16 shows wireless devices, in accordance with an embodiment of the present disclosure.

FIG. 16 shows wireless devices, in accordance with an embodiment of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
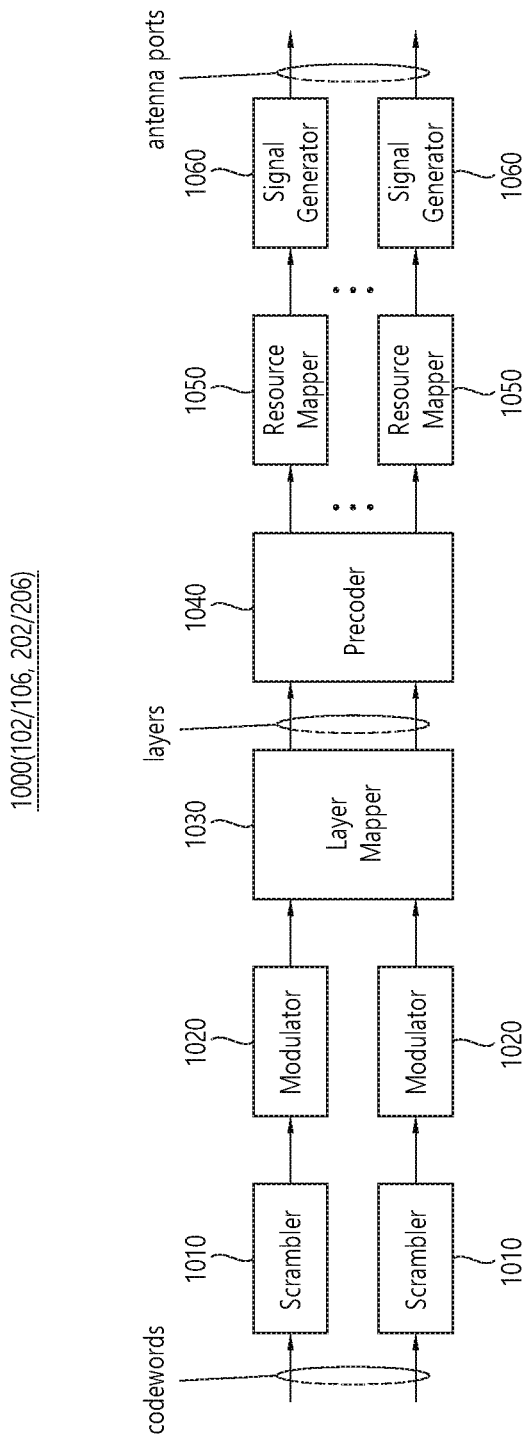
FIG. 17 shows a signal process circuit for a transmission signal, in accordance with an embodiment of the present disclosure.

FIG. 17 shows a signal process circuit for a transmission signal, in accordance with an embodiment of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 18:
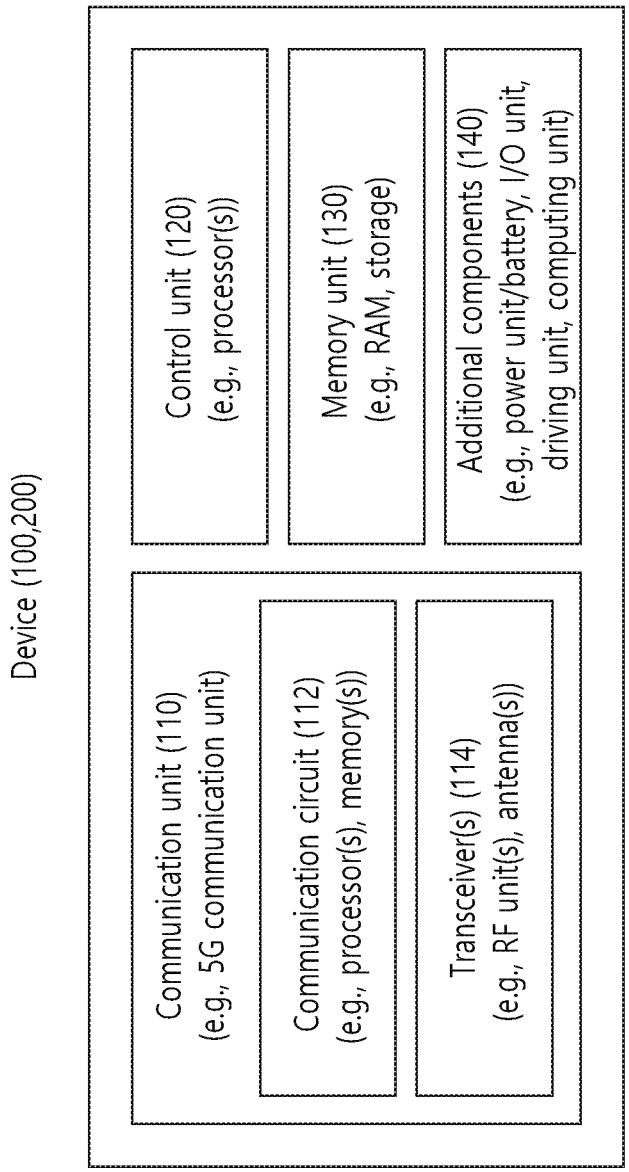
FIG. 18 shows a wireless device, in accordance with an embodiment of the present disclosure.

FIG. 18 shows another example of a wireless device, in accordance with an embodiment of the present disclosure. The wireless device may be implemented in various forms according to a use-case/service (refer to FIG. 15).

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
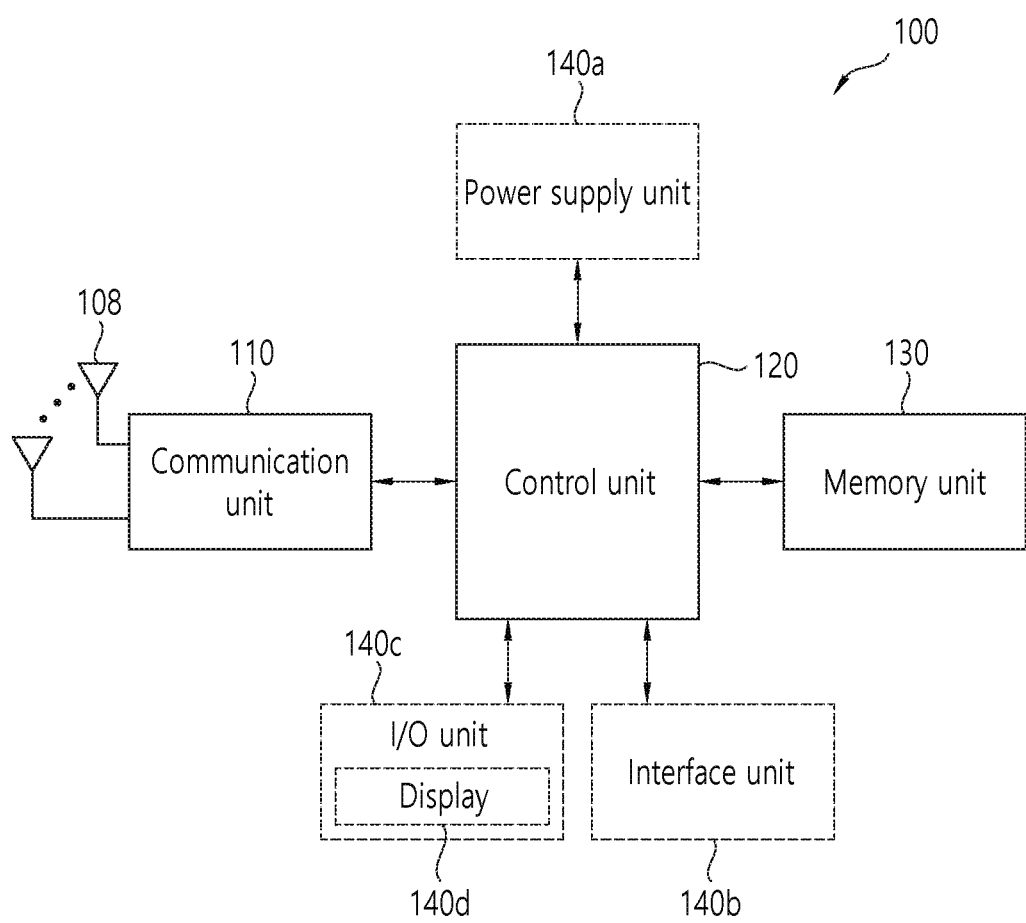
FIG. 19 shows a hand-held device, in accordance with an embodiment of the present disclosure.

FIG. 19 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 19, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 20:
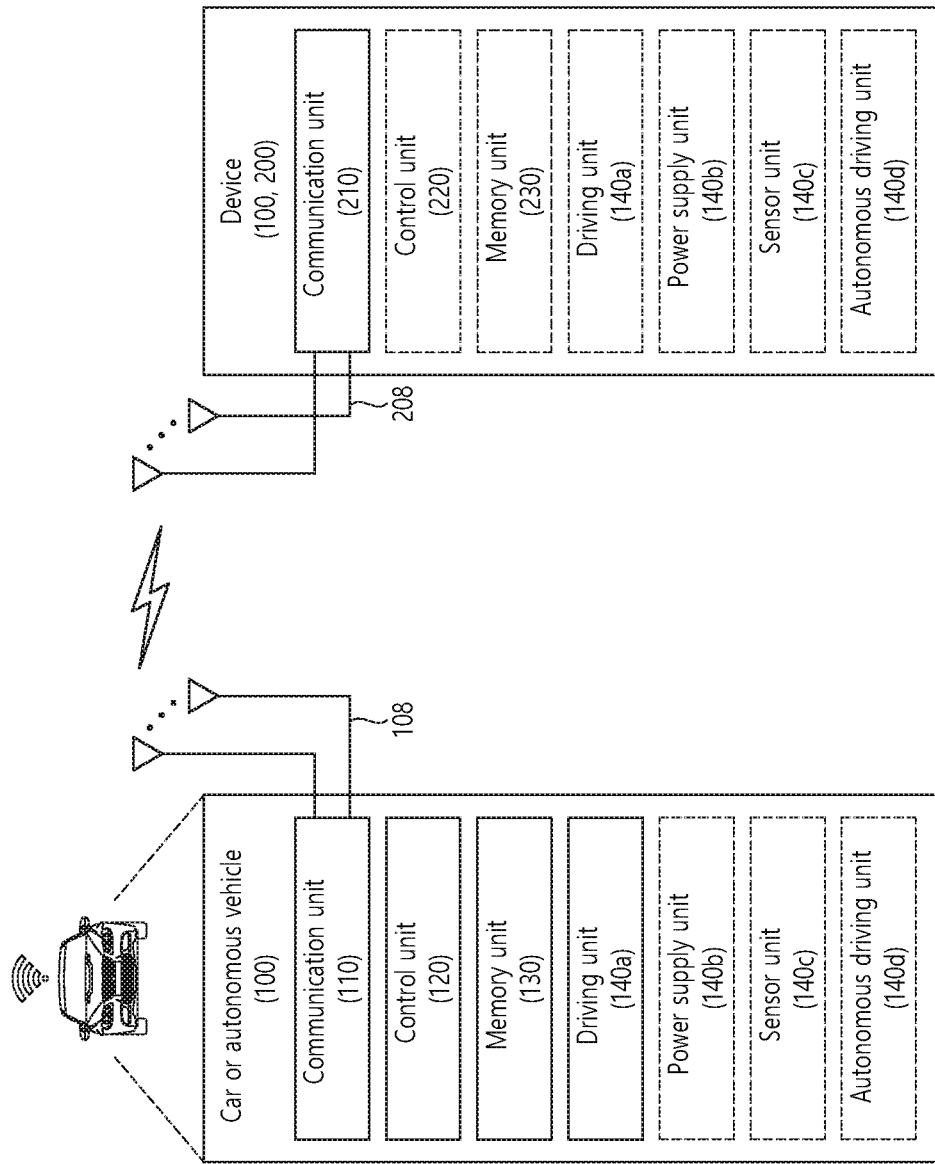
FIG. 20 shows a car or an autonomous vehicle, in accordance with an embodiment of the present disclosure.

FIG. 20 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 20, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first apparatus, the method comprising:
   receiving a configuration related to a Uu bandwidth part (BWP) from a base station; and
   receiving a configuration related to a sidelink (SL) BWP from the base station,
   wherein, based on a numerology of the Uu BWP and a numerology of the SL BWP being different, performing SL communication on the SL BWP is not allowed for the first apparatus, and
   wherein, based on the numerology of the Uu BWP and the numerology of the SL BWP being same, performing the SL communication on the SL BWP is allowed for the first apparatus.

2. The method of claim 1, wherein the numerology of the Uu BWP and the numerology of the SL BWP include at least one of subcarrier spacing and cyclic prefix (CP).

3. The method of claim 2, wherein the subcarrier spacing is one of 15 kHz, 30 kHz, 60 kHz, 120 kHz, or 240 kHz.

4. The method of claim 2, wherein the cyclic prefix (CP) is one of a normal cyclic prefix (CP) and an extended cyclic prefix (CP).

5. The method of claim 1, wherein, based on the numerology of the Uu BWP and the numerology of the SL BWP being different, the SL BWP is deactivated.

6. The method of claim 5, wherein the Uu BWP is an active BWP.

7. The method of claim 6, wherein the active BWP is an active uplink BWP or an active downlink BWP.

8. The method of claim 1, wherein, based on the numerology of the Uu BWP and the numerology of the SL BWP being different, performing Uu BWP-based SL communication on the SL BWP is not allowed for the first apparatus.

9. The method of claim 8, wherein the Uu BWP-based SL communication is SL communication performed by the first apparatus on the SL BWP based on Downlink Control Information (DCI) received, by the first apparatus, from the base station on the Uu BWP.

10. The method of claim 1, wherein, based on an interruption time being required between the Uu BWP-based communication and the SL BWP-based communication, performing the SL communication on the SL BWP is not allowed for the first apparatus.

11. The method of claim 1, wherein a configuration related to the Uu BWP includes at least one of a numerology related to the Uu BWP, a center frequency related to the Uu BWP, or a bandwidth related to the Uu BWP, and
   wherein a configuration related to the SL BWP includes at least one of a numerology related to the SL BWP, a center frequency related to the SL BWP, or a bandwidth related to the SL BWP.

12. The method of claim 1, wherein the SL BWP is a BWP related to SL communication being configured for the first apparatus, and
   wherein the Uu BWP is at least one of a BWP related to an uplink communication or a BWP related to a downlink communication being configured for the first apparatus.

13. A first apparatus configured to perform wireless communication, the first apparatus comprising:
   one or more memories storing instructions;
   one or more transceivers; and
   one or more processors connected to the one or more memories and the one or more transceivers, wherein the one or more processors are configured to execute the instructions to:
   receive a configuration related to a Uu bandwidth part (BWP) from a base station, and
   receive a configuration related to a sidelink (SL) BWP from the base station,
   wherein, based on a numerology of the Uu BWP and a numerology of the SL BWP being different, performing SL communication on the SL BWP is not allowed for the first apparatus, and
   wherein, based on the numerology of the Uu BWP and the numerology of the SL BWP being same, performing the SL communication on the SL BWP is allowed for the first apparatus.

* * * * *